July 1, 1969 JAMES E. WEBB 3,452,423
ADMINISTRATOR OF THE NATIONAL AERONAUTICS
AND SPACE ADMINISTRATION

SEGMENTING LEAD TELLURIDE-SILICON GERMANIUM THERMOELEMENTS

Filed Sept. 30, 1966

INVENTORS
Martin Weinstein
Herbert E. Bates &
Joseph Epstein

BY
ATTORNEYS

INVENTORS
Martin Weinstein
Herbert E. Bates &
Joseph Epstein

BY

ATTORNEYS

United States Patent Office 3,452,423
Patented July 1, 1969

3,452,423

SEGMENTING LEAD TELLURIDE-SILICON GERMANIUM THERMOELEMENTS

James E. Webb, Administrator of the National Aeronautics and Space Administration, with respect to an invention of Martin Weinstein, Wayland, and Herbert E. Bates, Sudbury, Mass., and Joseph Epstein, Baltimore, Md.

Filed Sept. 30, 1966, Ser. No. 584,071
Int. Cl. H01l 7/04, 7/16
U.S. Cl. 29—472.9 3 Claims The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates to thermoelectric generators and more particularly to a method of segmenting different thermoelectric materials.

Thermoelectric generators offer substantial advantages over the more conventional electrical power sources. These generators contain no moving parts and are essentially free from maintenance and noise in operation. They are capable of operating at very high temperatures and over a wide range of input conditions. Additionally, aside from heat they require no external support as contrasted with a rotary generator, for example, which requires some form of motor and fuel. Also, the efficiency of a thermoelectric generator is not dependent upon size, but is determined solely by the Carnot cycle and the generator's inherent index of efficiency.

The segmenting of various thermoelectric materials has long been hypothesized as a method for increasing the efficiency and utility of thermoelectric energy conversion systems. The ability to couple the best attributes of two or more materials over an extended temperature range would provide a significant increase in thermal utilization and result in a high overall efficiency and specific power. This is especially important in space power systems dependent upon radioisotope decay as a thermal energy source. High efficiency and specific power are directly related to low system weights and fuel inventories; and indirectly related to reliability and lifetime by providing the means for achieving redundancy, derating, and margins of safety at reduced system weight penalties.

The thermoelectric materials of greatest interest for space power systems are lead telluride (PbTe) and silicon germanium (SiGe). Each of these materials demonstrate relatively high efficiencies within their operative temperature ranges. Both lead telluride and silicon germanium have been segmented with some success to various other materials; the former with other tellurides and the latter with some of the Group III–V compounds and with doped carbides. However, the two materials are not known to have been successfully joined to form an integral thermoelement in spite of the excellent temperature regime coupling which would be achieved.

It is therefore an object of this invention to provide a method for segmenting different types of thermoelectric elements to achieve a composite element effective over a wide temperature range.

It is a further object of this invention to provide a method of segmenting lead telluride and silicon germanium thermoelectric elements to obtain a composite element effective over a wide temperature range.

It is an additional object of the invention to provide a method for segmenting different types of thermoelectric elements through a strong, stable, non-magnetic bond which will not adversely affect the semiconductor properties of the thermoelectric elements.

It is another object of this invention to provide a segmented thermoelectric element composed of thermoelectric materials having complementary operational characteristics.

According to the method of this invention, a segmented thermoelectric element is produced by first thoroughly cleaning two thermoelectric elements of different but complementary operative temperature ranges, holding the elements in intimate contact in a bonding fixture, and heating the elements in a suitable furnace for a preselected time within a certain temperature range.

Other objects and features of the invention will become apparent to those skilled in the art as the disclosure is made in the following description of a preferred embodiment of the invention as illustrated in the accompanying sheet of drawings in which.

Figure 1:
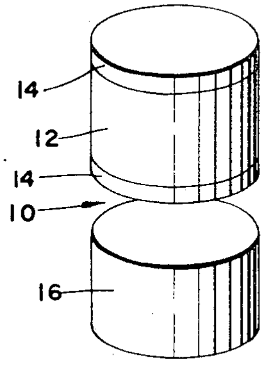
FIGURE 1 is an exploded view in perspective of the article produced by the method of this invention.

Referring now to FIGURE 1 the elements of the device 10 are shown before segmenting. Silicon-germanium element 12 has bonded thereto tungsten electrodes 14. The lead telluride elements 16 constitute the remaining half of the device. The PbTe material used is formed by cold pressing and sintering. Present day PbTe elements exhibit an efficiency of roughly 5 percent over a temperature range of 0–500° C., while the SiGe elements exhibit substantially the same efficiency over a range of 500–900° C.

Figure 2:
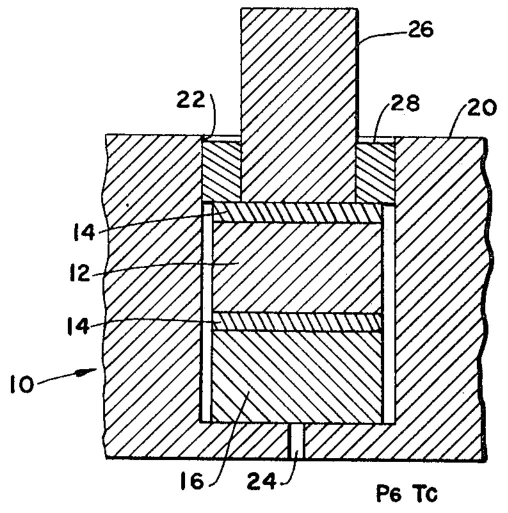
FIGURE 2 is a fragmentary sectional view in elevation of a bonding fixture loaded according to the method of the invention.

Prior to loading the thermoelectric elements 12 and 14 into the bonding fixture 20 as shown in FIGURE 2 it is necessary to thoroughly clean all the elements to be joined. The tungsten-bonded SiGe elements 12 are first treated by sanding the tungsten electrode surface with silicon carbide paper. The surfaces are further finished by lapping with increasingly fine silicon carbide and finally with aluminum oxide. The elements are then degreased in boiling trichlorethylene, cleaned ultrasonically in an alcohol and deionized water solution, rinsed in runing deionized water, and rinsed again in boiling methanol. The elements are retained submerged in methanol until immediately prior to being loaded into the bonding fixture.

The lead telluride elements are prepared for bonding by first sanding all surfaces with 600 grit silicon carbide paper and then lapping the contact surfaces with increasingly fine silicon carbide. A final lap with fine grit aluminum oxide is also desirable. The remaining degreasing and cleaning process is the same as that described above for the tungsten bonded silicon germanium elements. Although the preceding cleaning method is preferred, any method could be employed as long as the flatness of the resultant interface is not adulterated.

Referring now to FIGURE 2 a graphite bonding fixture 20 contains a plurality of vertical holding bores 22 (only one has been shown). Reduced bore 24 communicates with the holding bore 22 and serves to vent gases produced during the fusion bonding process. Additional venting bores (not shown) are located along the vertical periphery of the bore 22. The bore 22 is slightly larger than the circumference of the elements to be joined.

Each holding bore 22 is loaded by first inserting a lead telluride element 16 and then inserting a tungsten-bonded silicon germanium element 12 thereover. A tungsten weight 26 and iron spacer ring 28 are then applied to the top surface of the element 10 to maintain proper alignment during the bonding process. The iron spacer 28 should be cleaned by sandblasting prior to use, and both the spacer and the weight 26 should preferably be degreased and cleaned in the same manner as described above for the thermoelectric elements.

Figure 3:
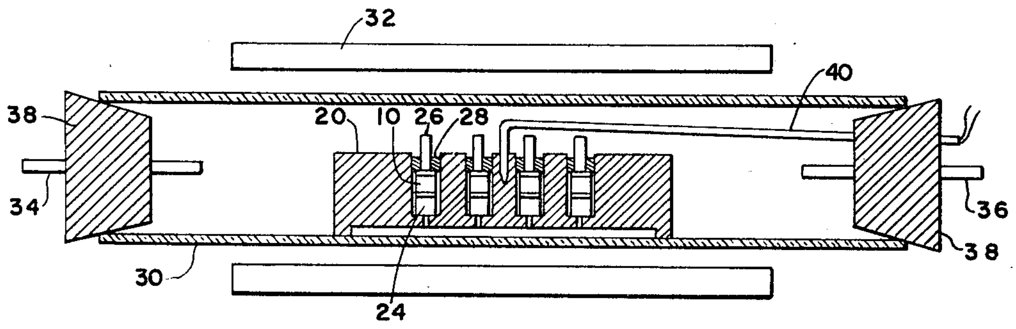
FIGURE 3 is a schematic view partly in cross-section illustrating members being bonded in accordance with the invention.

Once the graphite fixture 20 has been loaded, it is inserted as shown in FIGURE 3, within a quartz tube 30 into the hot zone of a resistance furnace as shown schematically at 32. The tube 30 is then purged with argon or helium through inlet 34 and outlet 36 located within the resilient stoppers 38. Furnace temperature is monitored through the use of thermocouple probe 40.

After the atmosphere of the system has been purged of gaseous impurities the resistance furnace is brought to a preselected temperature depending upon the conductivity type of the elements being segmented. For N type elements a temperature range of 850–865° C. for a period of approximately 25 minutes is sufficient to complete the bonding process. A range of 840–850° C. held for approximately 25 minutes is sufficient for P type elements. As a result of the heating step, the tungsten of electrode 14 is contacted to the PbTe element 16 forming a strong, stable non-magnetic, low-resistance bond.

Figure 4:
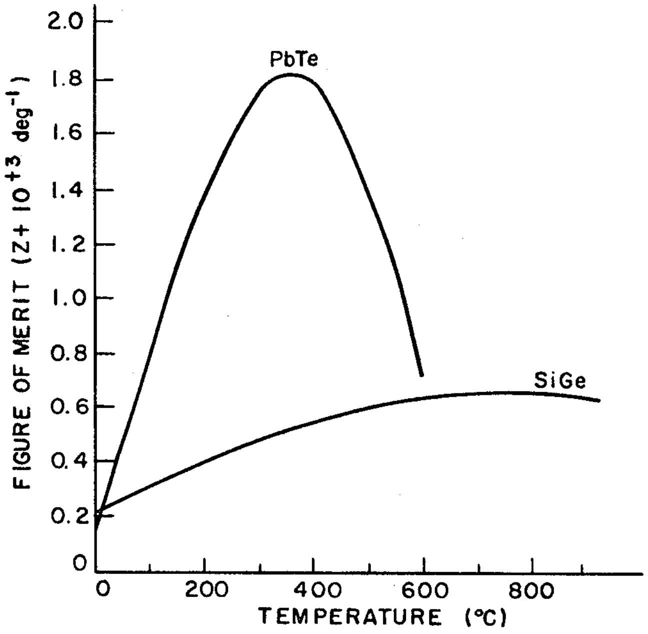
FIGURES 4 and 5 are graphs depicting the operative temperature ranges and relative efficiencies of the thermoelectric materials segmented by the method of this invention.
Figure 5:
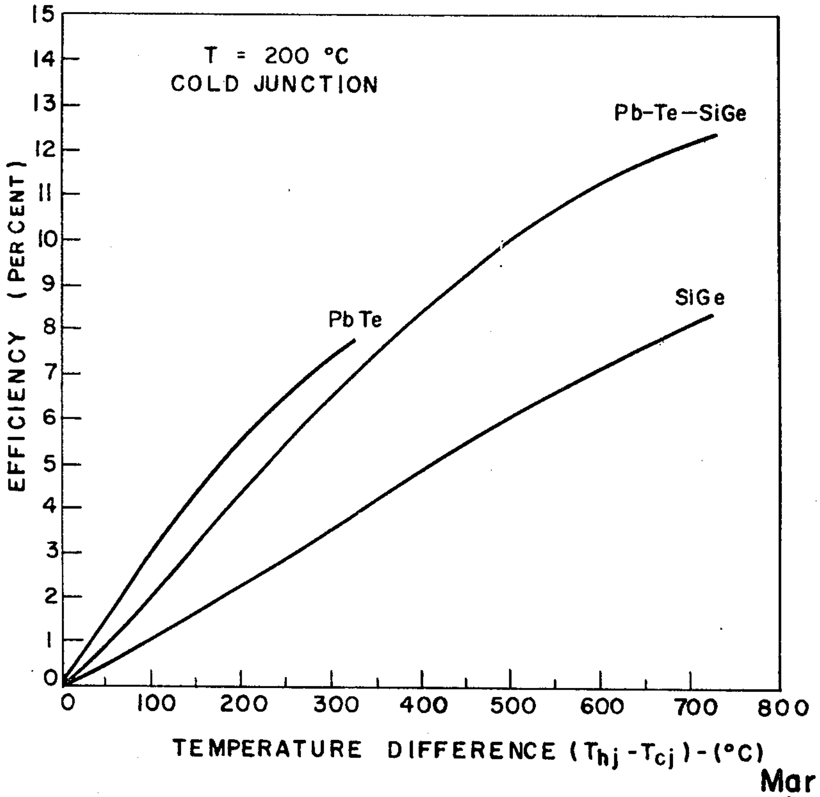

The graphs of FIGURES 4 and 5 depict the advantageous temperature range coupling which results from the segmenting made possible by this invention. FIGURE 4 depicts figures of merit for both lead telluride and silicon germanium for given operating temperatures. Considering that the optimum attainable cold junction temperature for terrestrial applications is about 25° C. and about 175° C. for aerospace applications, it is readily seen that for expanded temperature ranges (hot junction temperature minus cold junction temperature) segmenting of the two materials would greatly increase efficiency. Yet prior to this invention, coupling of the materials was believed unattainable due to the obvious mismatch in thermal expansion characteristics. However, such coupling has been achieved by the method of this invention. FIGURE 5 represents the increased efficiency attainable in aerospace applications. The cold junction temperature in this instance is taken as 200° C. A more complete understanding of the invention may be attained from the following example:

Example

Silicon-germanium elements 0.79 cm. in length having 1.0 mm. tungsten electrodes bonded thereto were prepared for bonding by first sanding the tungsten electrode surfaces on 240 grit SiC paper. The same surfaces were then lapped in the following sequence:

180 grit SiC
320 grit SiC
600 grit SiC
1800 grit $Al_2O_3$

The SiGe elements were then degreased in boiling trichlorethylene for 5 minutes, cleaned ultrasonically in a solution of Alcanox and deionized $H_2O$, rinsed thoroughly in running deionized $H_2O$, rinsed again in boiling methanol for 5 minutes and then submerged in methanol until immediately prior to being loaded into the bonding fixture.

The lead telluride elements measured approximately 1.11 cm. in diameter and 0.635 cm. in length. All surfaces of the PbTe elements were first sanded on 600 grit SiC paper to remove oxide and then the contact surfaces were lapped in the following sequence:

240 grit SiC
400 grit SiC
600 grit SiC
1800 grit $Al_2O_3$

The PbTe elements were then subjected to the same degreasing and cleaning procedure as described above for the W-bonded SiGe elements.

A graphite bonding fixture having vertical holding bores approximately 0.020″ oversize is next loaded with the elements which have been warm air dried upon removal from the methanol storage solution. The fixture (loaded as shown in FIGURES 2 and 3) is then inserted into the hot zone of a resistance furnace which is then purged with high purity Ar (1.5 p.p.m. $O_2$) for a period of 5 minutes. For N type elements the furnace is brought to a temperature of from 850 to 865° C. and held for 25 minutes. A range of 840–850° C. held for the same period of time is sufficient to accomplish the diffusion in P type elements. The furnace is turned off, and the system is cooled in Ar flow.

A composite, segmented thermoelement is thus obtained which combines the useful properties of complementary elements through a stable, non-magnetic bond to achieve an increased efficiency over a wide operational temperature range.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A method of segmenting thermoelectric materials of complementary operational characteristics comprising:

providing a silicon-germanium thermoelectric element having a tungsten electrode bonded to one end thereof, providing a lead-telluride thermoelectric element having an operational range different from but complementary to that of the silicon-germanium element, lapping the electrode surface of the silicon germanium element and an end surface of the lead-telluride element to form a flat interface therebetween, assembling the silicon-germanium and lead-telluride elements so that the lapped surfaces are in close contact, and heating the assembly to a temperature of from 840° C. to 865° C. for a period of time sufficient to bond the tungsten electrode to the lead-telluride thermoelectric element to form a stable, low-resistance bond.

2. The method of claim 1 wherein: the heating step is carried out in a protective atmosphere of a gas selected from the group consisting of helium and argon.

3. The method of claim 1 wherein the heating step is for a period of approximately 25 minutes.

References Cited

UNITED STATES PATENTS

| | | | |
|---|---|---|---|
| 3,000,092 | 9/1961 | Scuro | 29—472.9 X |
| 3,030,704 | 4/1962 | Hall | 29—472.9 |
| 3,139,680 | 7/1964 | Scuro | 29—472.9 |
| 3,216,088 | 11/1965 | Fraser | 29—472.9 X |
| 3,235,957 | 2/1966 | Horsting | 29—573 X |
| 3,298,095 | 1/1967 | Hicks | 29—573 X |
| 3,306,784 | 2/1967 | Roes | 29—573 X |
| 3,342,567 | 9/1967 | Dingwall | 29—472.9 X |

JOHN F. CAMPBELL, *Primary Examiner.*

R. F. DROPKIN, *Assistant Examiner.*

U.S. Cl. X.R.

29—195, 494, 498, 504, 573, 590; 136—205; 287—189365